(12) United States Patent
Cheng et al.

(10) Patent No.: US 8,004,597 B2
(45) Date of Patent: Aug. 23, 2011

(54) FOCUSING CONTROL APPARATUS AND METHOD

(75) Inventors: Sheng-Hung Cheng, Tao Yuan Shien (TW); Hsin-Yu Chen, Tainan (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 407 days.

(21) Appl. No.: 12/230,133

(22) Filed: Aug. 25, 2008

(65) Prior Publication Data
US 2008/0316352 A1    Dec. 25, 2008

(30) Foreign Application Priority Data
Dec. 5, 2007    (TW) ................ 96146229 A (51) Int. Cl.
*H04N 5/232*    (2006.01)
(52) U.S. Cl. .................. 348/345; 348/208.12

(58) Field of Classification Search ........... 348/345, 348/208.12
See application file for complete search history.

(56) References Cited

U.S. PATENT DOCUMENTS

| | | | | |
|---|---|---|---|---|
| 2001/0026683 | A1* | 10/2001 | Morimoto et al. | 396/89 |
| 2003/0040659 | A1* | 2/2003 | Kazakevich | 600/167 |
| 2003/0063212 | A1* | 4/2003 | Watanabe et al. | 348/349 |
| 2005/0089208 | A1* | 4/2005 | Dong et al. | 382/133 |

* cited by examiner

*Primary Examiner* — Jason Chan
*Assistant Examiner* — Usman Khan
(74) *Attorney, Agent, or Firm* — Thomas|Kayden (57) ABSTRACT

The invention discloses a focusing control apparatus applied in an image recording system. The focusing control apparatus of the invention includes an evaluating unit and a control module. The evaluating unit can generate a plurality of focus values in accordance with an image sensed by a sensor. Furthermore, the control module can calculate a weight focus value in accordance with the focus values, and selectively generates a control signal based on the weight focus value and a depth of focus table, so as to control the movement of a lens.

12 Claims, 10 Drawing Sheets

| $G_1$ | $G_2$ | $G_3$ |
|---|---|---|
| $G_4$ | $G_C$ | $G_5$ |
| $G_6$ | $G_7$ | $G_8$ |

FOCUSING CONTROL APPARATUS AND METHOD

BACKGROUND OF THE INVENTION

1. Field of the Invention

The present invention relates generally to a focusing control apparatus and method, and more particularly, to a fast and accurate focusing control apparatus and method.

2. Description of the Prior Art

With the coming of digital era, a lot of digital apparatuses have been widely applied in the modern life. Wherein, digital image recording equipment, such as digital camera (DC) or digital video recorder (DV), has gradually replaced traditional image recording equipment. Moreover, digital image recording system has been disposed in many portable electronic apparatus, such as mobile phones, personal digital assistants (PDA), or notebooks, so as to allow the users to capture images any time any where.

In the past, the resolution of the digital image recording system applied in most of the above-mentioned portable electronic apparatus is less than mega-pixel. Because the image quality of the portable electronic apparatus is not determined by the focusing apparatus, most digital image recording systems of the portable electronic apparatuses apply prime lens rather than zoom lens. With the increase of sensor resolution, the quality of image is more emphasized than before. Accordingly, zoom lens is gradually used in the digital image recording systems of the portable electronic apparatuses.

Figure 1:
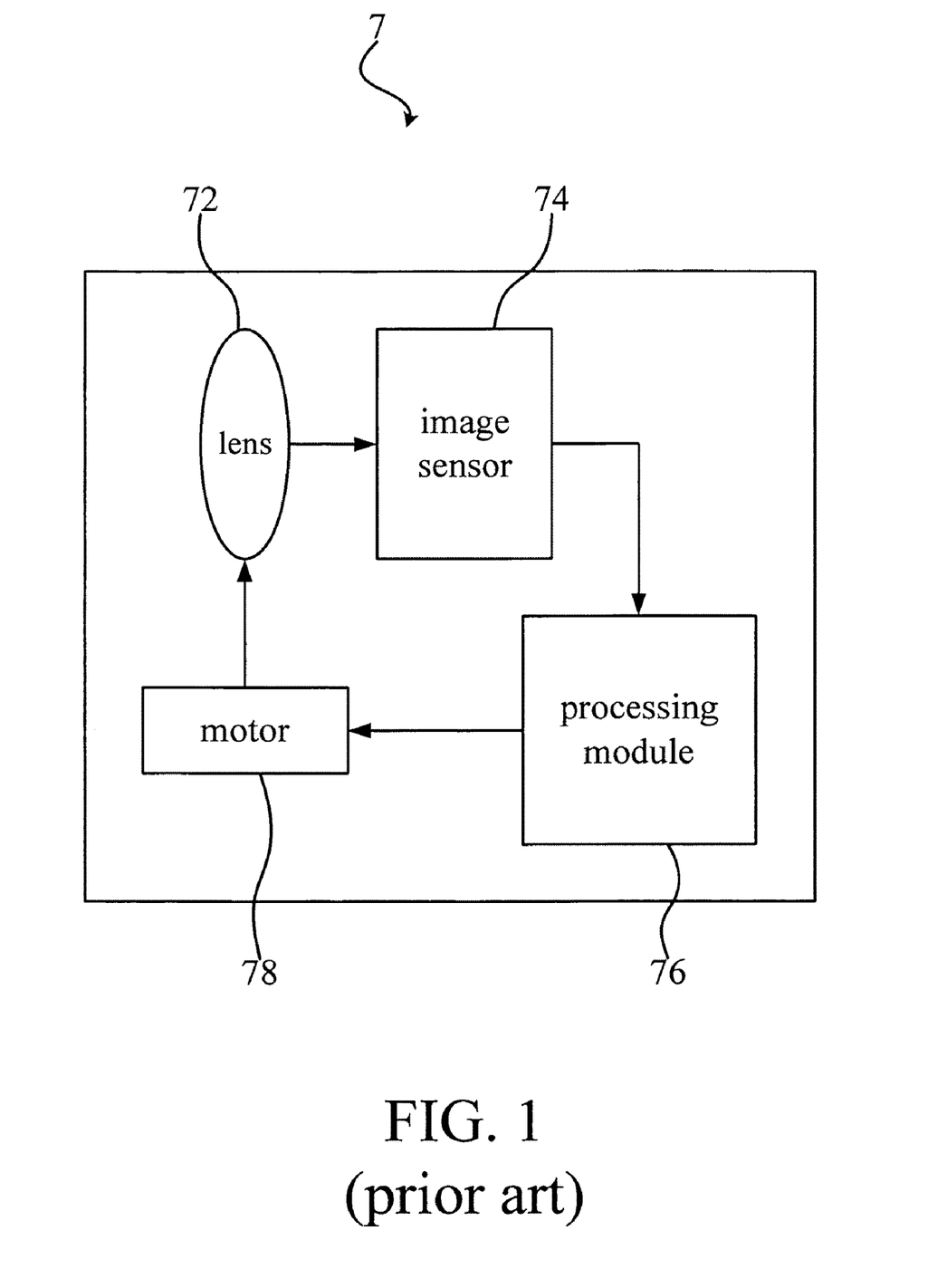
FIG. 1 illustrates a functional block of a digital image recording system of the prior art.

Please refer to FIG. 1, which illustrates a functional block of a digital image recording system of the prior art. As shown in FIG. 1, the digital image recording system 7 includes a lens 72, an image sensor 74, a processing module 76 and a motor 78. The image sensor 74, such as a CCD or a CMOS, can sense image through the lens 72, and transfer the sensed image to the processing module 76. The processing module 76 can perform noise inhibition, image sharpness evaluation and other suitable processes to the image, and output the processed image. Additionally, the processing module 76 can further generate a control signal based on the image, and can send the control signal to the motor 78, such that the motor 78 can adjust the position of the lens 72, according to the control signal, to focus for better focusing.

In the prior art, the focusing process of the digital image recording system can mainly be divided into two steps: image sharpness evaluation and focus search. The image sharpness evaluation is used to determine the clarity of the image, and the focus search is used to move the lens to suitable focus position. Additionally, it is important to find the ways to focus quickly and efficiently when the digital image recording system is applied in the above-mentioned portable electronic apparatus.

Currently, many image sharpness evaluation algorithms have been applied in digital cameras, however, most of the algorithms are too complicated to be applied in the above-mentioned portable electronic apparatus. Moreover, one of the most popular focus searching algorithms is mountain climbing search method. The mountain climbing search method needs the motor to move the lens forward and backward to perform a coarse search which is followed by a fine search.

During the coarse search process, the motor moves the lens to each focusing position in a larger scale to obtain a focus value of each focusing position. When the slope of the curve constructed by the focus values is changed, the fine search process is initiated. During the fine search process, the motor moves back the lens in a smaller scale to the focusing positions with the maximum focus value. However, the focus searching algorithms needs the motor to move the lens forward and backward, it takes a lot of time to find the focusing position and increases the consumption of the motor and related driving elements.

SUMMARY OF THE INVENTION

Accordingly, one aspect of the present invention is to provide a focusing control apparatus and method for solving the above-mentioned problems.

According to the first preferred embodiment, the focusing control apparatus of the invention is applied in an image recording system, and the focusing control apparatus includes an evaluating unit and a control module. The evaluating unit can generate a plurality of focus values of an image based on the image sensed by a sensor. The control module can calculate a weight focus value in accordance with the focus values, and the control module selectively generates a control signal based on the weight focus value and a depth of focus table, so as to control the movement of the lens of the image recording system.

According to the second preferred embodiment, the focusing control method of the invention includes the following steps: firstly, establishing a depth of focus table based on at least a default parameter. Secondly, generates a plurality of focus values related to an image. Afterward, calculates a weight focus value according to the focus values. Finally, selectively generates a control signal to control the movement of a lens based on the weight focus value and the depth of focus table.

The objective of the present invention will no doubt become obvious to those of ordinary skill in the art after reading the following detailed description of the preferred embodiment, which is illustrated in the various figures and drawings.

DETAILED DESCRIPTION OF THE INVENTION

The invention provides a focusing control apparatus and method.

Figure 2:
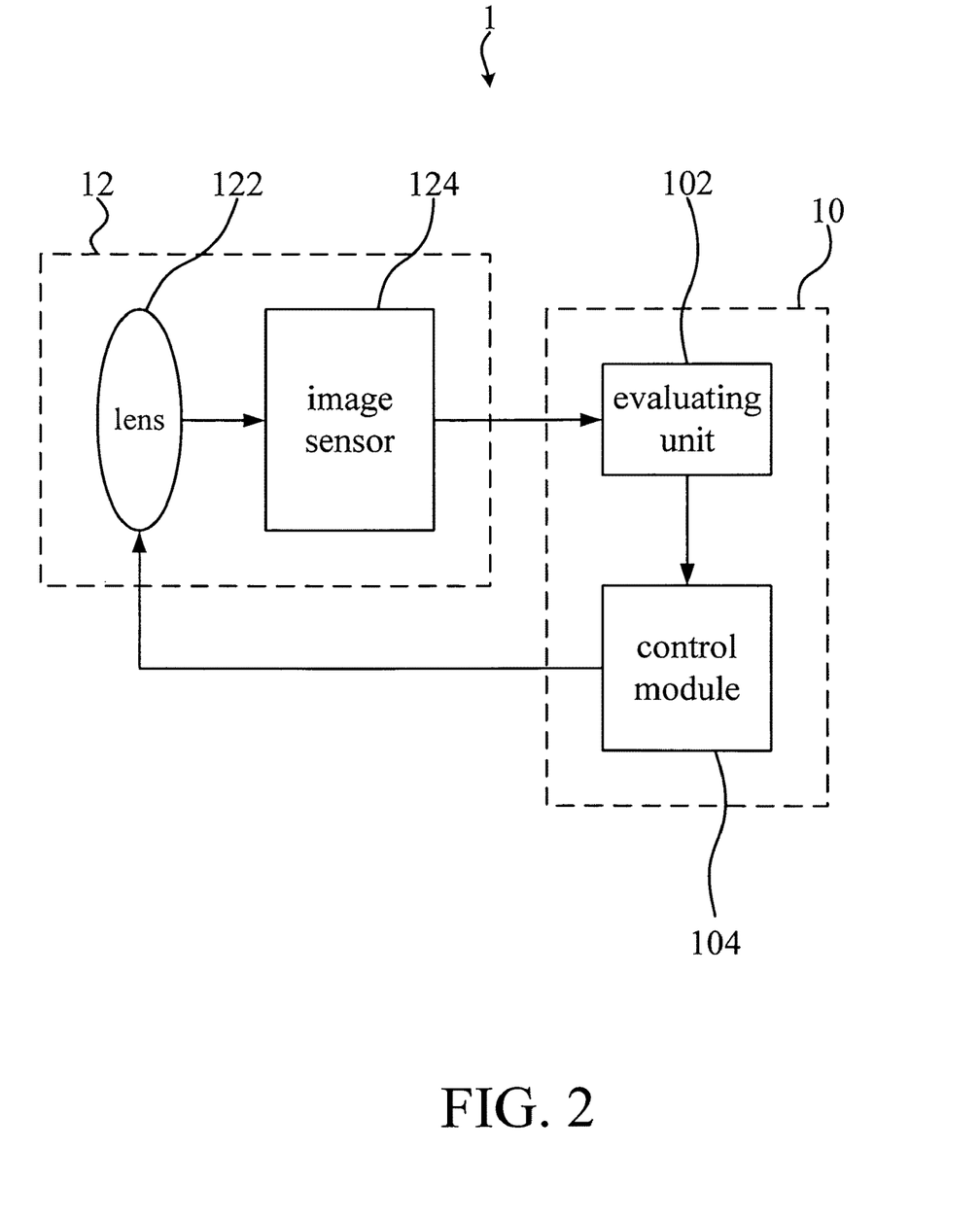
FIG. 2 illustrates a functional block of a focusing control apparatus of an embodiment of the invention.

Please refer to FIG. 2, which illustrates a functional block of a focusing control apparatus of an embodiment of the invention. As shown in FIG. 2, the focusing control apparatus 10 is applied in an image recording system 1, such as, but not limited to, digital camera, digital video camera, and mobile communication device with imaging function.

Furthermore, the image recording system 1 includes the focusing control apparatus 10 and an image capturing apparatus 12. The focusing control apparatus 10 mainly includes an evaluating unit 102 and a control module 104. The image capturing apparatus 12 includes a lens 122 and a sensor 124, such as Charge Coupled Device (CCD) or Complementary Metal-Oxide Semiconductor (CMOS). Particularly, the lens 122 is a zoom lens.

In the embodiment, when a user uses the image recording system 1 to capture or record an image, the image is projected to the sensor 124 through the lens 122, and the sensor 124 captures the image and sends the image to the focusing apparatus 10. Furthermore, the evaluating unit 102 receives the image and generates related focus values. In practice, the evaluating unit 102 performs the statistics of sharpness by gradient filter, for example, performs the statistics of sharpness of horizontal direction of the image by gradient filter [−1 0 1], and performs the statistics of sharpness of vertical direction of the image by the following gradient filter.

$$\begin{bmatrix} 5^1 \\ 0 \\ 1 \end{bmatrix}$$

Figure 3:
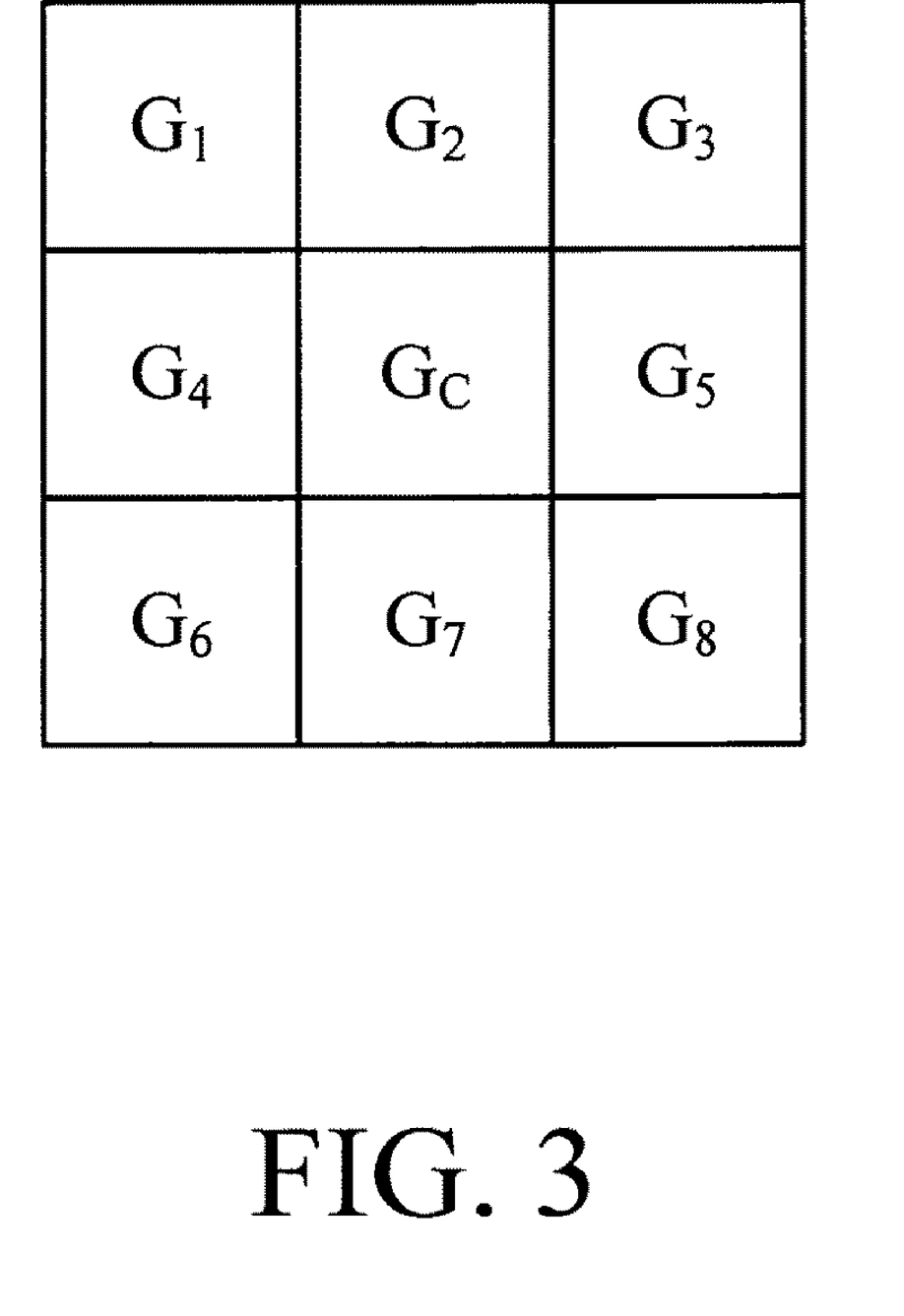
FIG. 3 illustrates a color plane of an image.

In practice, the image can be divided into several color planes, such as red color plane (R), green color plane (G), or blue color plane (B). Referring now to FIG. 3, which shows the color planes of the image. The focus values (F) of the image are calculated based on the following equation [1].

$$F = R(A_1 \times G_X + G_Y) + G(A_2 \times G_X + G_Y) + B(A_3 \times G_X + G_Y) \quad \text{equation [1]}$$

Wherein $G_X = |G_5 - G_4|$, $G_Y = |G_7 - G_2|$, and the coefficients $A_1$, $A_2$, and $A_3$ is applied for weighting the sharpness along a horizontal direction of the image.

Figure 4:
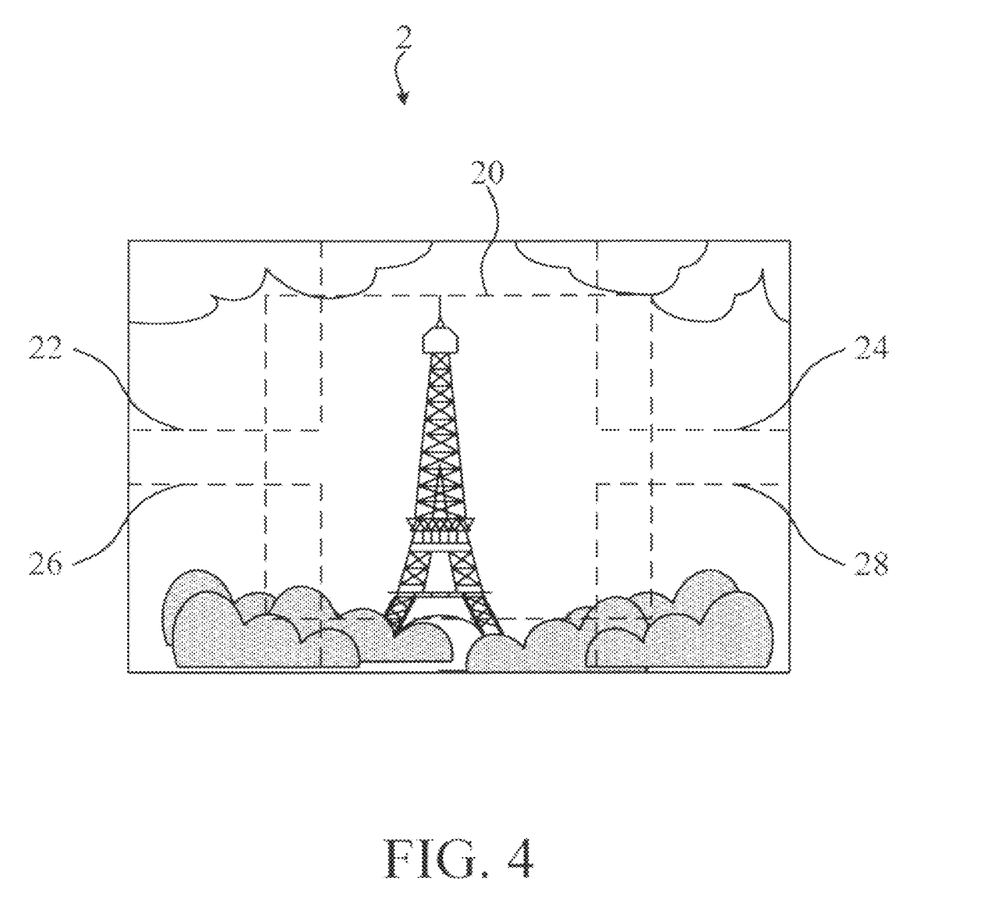
FIG. 4 illustrates an image and regions on the image.

In an embodiment, the image can be divided into a plurality of regions partly overlapped on the image. Please refer to FIG. 4, which illustrates an image and regions on the image. As shown in FIG. 4, the image 2 is divided into five partly overlapped regions: the first region 20, the second region 22, the third region 24, the fourth region 26, and the fifth region 28. Furthermore, the evaluating unit 102 of the invention can calculate the focus values of each of the regions based on the above-mentioned method. Accordingly, the evaluating unit 102 of the invention can efficiently calculate the focus values of low contrast image or over-exposed image. Particularly, the division of the image can further provide information of the change of scenery. For example, when the user moves the lens to make the tower move from the first region 20 to the third region 24, the focus value of each region will be changed, and the focusing control apparatus 10 can perform related processes. Pleased note that, in practice, the evaluating unit 102 of the invention can optionally divide the image into any numbers of regions.

In the embodiment, the control module 104 of the focusing control apparatus 10 can calculate the weight focus value ($F_W$) of the whole image according to the focus values of the regions as mentioned above and in the following equation [2].

$$F_W = F_1/2 + (F_2 + F_3 + F_4 + F_5)/4 \quad \text{equation [2]}$$

Wherein $F_1$ is the focus value of the first region 20, $F_2$ is the focus value of the second region 22, $F_3$ is the focus value of the third region 24, $F_4$ is the focus value of the fourth region 26, and $F_5$ is the focus value of the fifth region 28.

The control module 104 selectively generates control signal, according to the weight focus value and the depth of focus table, to control the movement of lens 122. Practically, the control module 104 can send the control signal to a driving module (not shown) which includes a motor to control the movement of the lens 122 based on the control signal.

Figure 5:
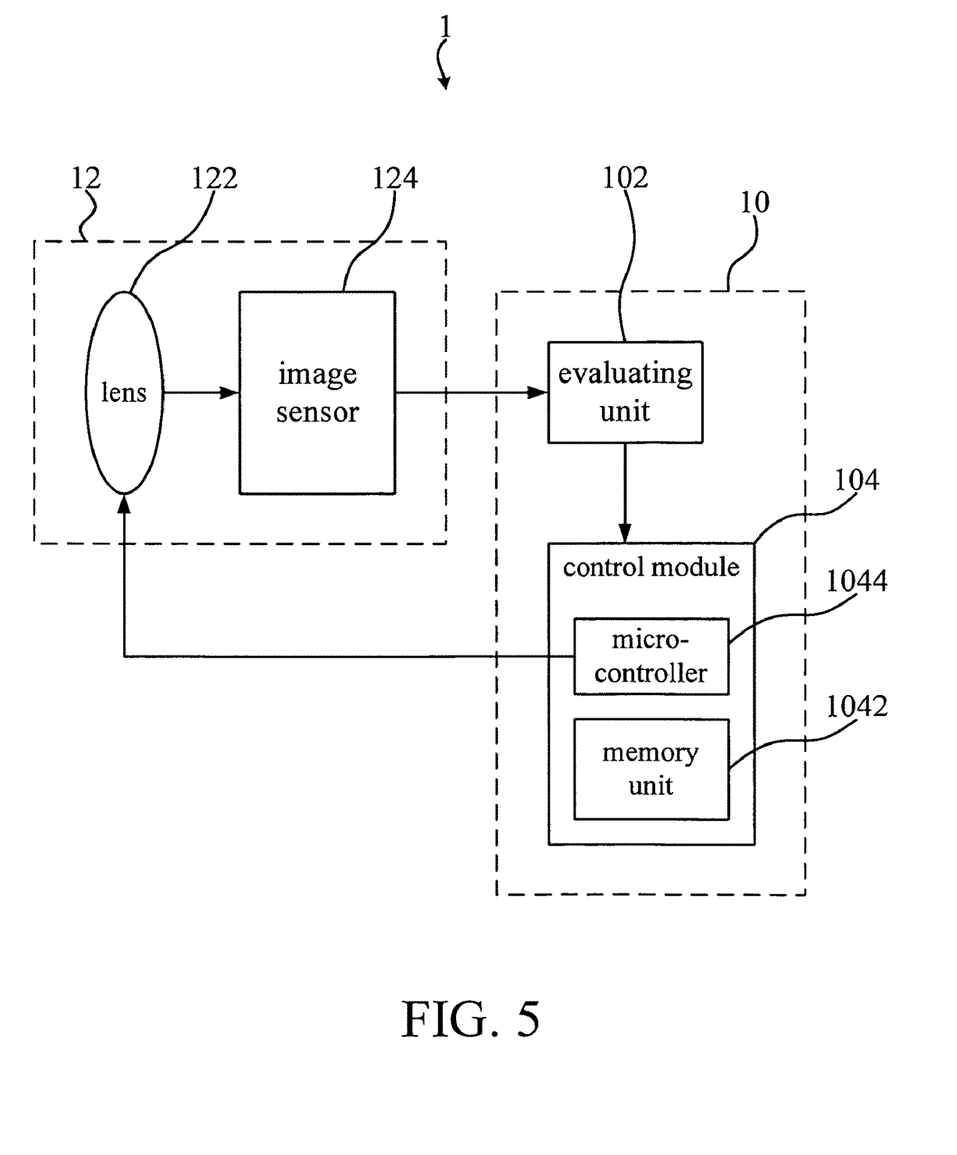
FIG. 5 illustrates a functional block of a focusing control apparatus of an embodiment of the invention.

Please further refer to FIG. 5, which illustrates a functional block of the focusing control apparatus of an embodiment of the invention. As shown in FIG. 5, the control module 104 of the focusing control apparatus 10 of the invention further includes a memory and a micro-controller 1044. The memory 1042 can be used for recording the depth of focus table, and the micro-controller 1044 can be used for controlling the movement of the lens 122 in accordance with the control signal. Please noted that the memory 1042 and the micro-controller 1044 can be integrated in the control module 104 or optionally be independent in the focusing control apparatus 10. Moreover, in practice, the focusing control apparatus of the invention can optionally include other suitable processing units, such as, but not limited to, noise-inhibition unit, decoding unit, or image-outputting unit.

Figure 6:
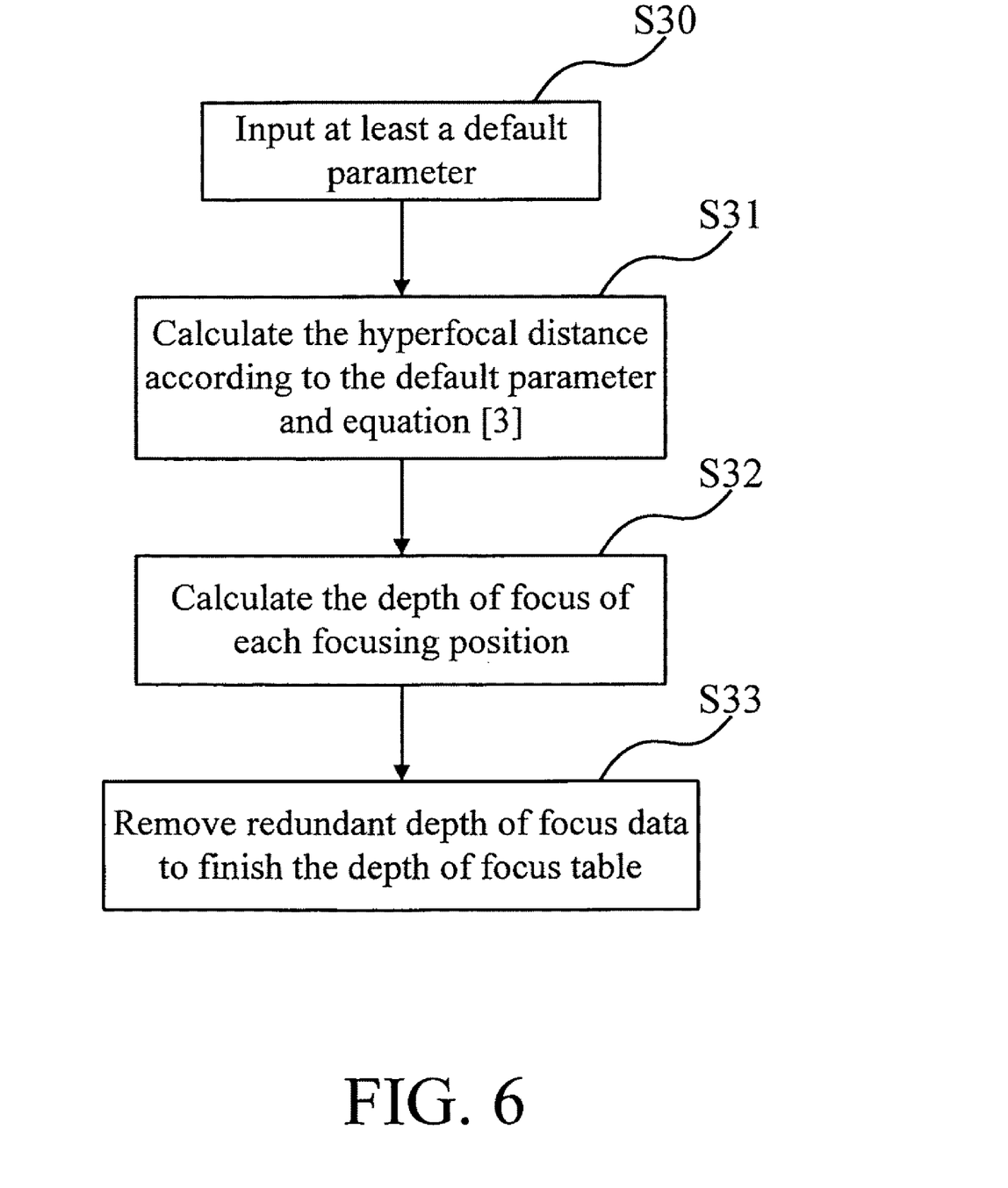
FIG. 6 shows the steps of the method for establishing the depth of focus table of the invention.

Practically, the above-mentioned depth of focus table can be established during the procedure of producing the image recording system. Please refer to FIG. 6, which shows the steps of establishing the depth of focus table. As shown in FIG. 6, at least a default parameter is inputted (step S30). In practice, the default parameter can be, but not limited to, the focal length of lens, the pixel size of the sensor, F number (focal length/aperture diameter), and the moving range of the lens. Then, calculates the hyperfocal distance (HD) according to the default parameter and the following equation [3] (step S31).

$$HD = (1 + (FL/2 \times F\text{num})/(SP \times 2)) \times FL \quad \text{equation [3]}$$

Wherein FL is the focal length of the lens; $F_{num}$ is F number; and SP is the pixel size of the sensor.

Afterward, calculates the depth of focus of each focusing position from the distance duration between (hyperfocal distance/2) and (hyperfocal distance/2+the moving distance of the lens) (step S32). Finally, removes redundant depth of focus data to finish the depth of focus table (step S33). For example, assume the depth of focus is 2 cm to 10 cm when the lens is moved a N unit distance to be located at focusing position A, and the depth of focus is 4 cm to 7 cm when the lens is moved a (N+1) unit distance to be located at focusing position B. Because the range of the depth of focus of focusing position B is in the range of the depth of focus of focusing position A, the depth of focus of focusing position B can be removed to simplify the content of the depth of focus table.

Figure 7:
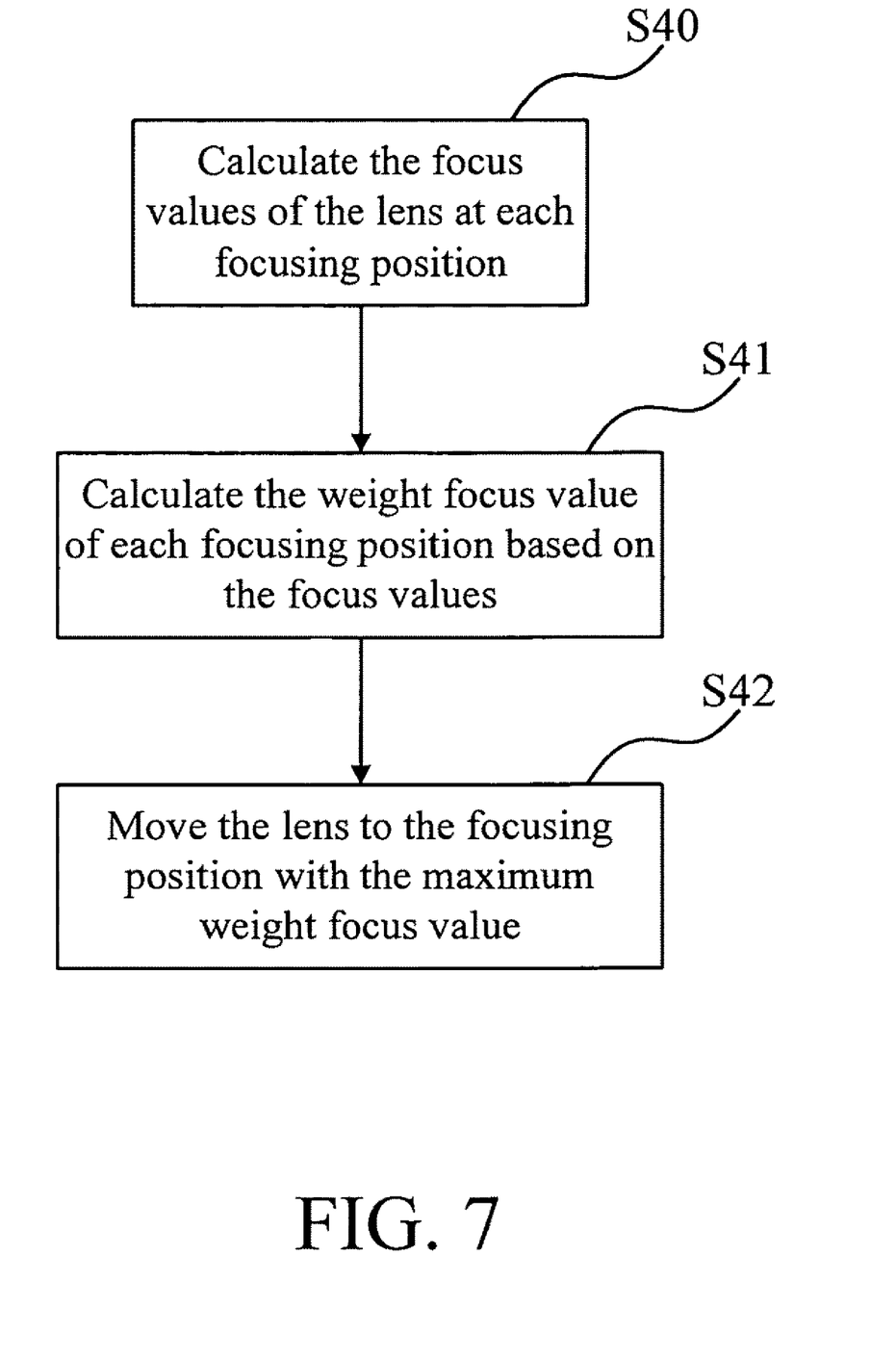
FIG. 7 shows the steps of the focusing control method of an embodiment of the invention.

In an embodiment, when the image recording system is in a static imaging mode, the control module of the invention can control the lens moving to a focusing position with the maximum weight focus value. Please refer to FIG. 7, which shows the steps of the focusing control method of an embodiment of the invention. As shown in FIG. 7, when the image recording system is in the static imaging mode, the focusing control apparatus of the invention calculates the focus values of the lens at each focusing position according to the above-mentioned equation [1] (step S40), and then calculates the weight focus value of each focusing position according to the above-mentioned equation [2] (step S41). Finally, moves the lens to the focusing position with the maximum weight focus value (step S42). Generally, the above-mentioned steps can be performed when the user aims the image recording system at the desired scenery and half-presses the shutter.

In another embodiment, when the image recording system is in a dynamic imaging mode, the control module of the invention compares the focus values of a current frame and its previous frame in a series of frames. When the difference between said focus values is larger than a threshold, the control module generates the control signal to control the lens moving to a focusing position with the maximum weight focus value.

Figure 8:
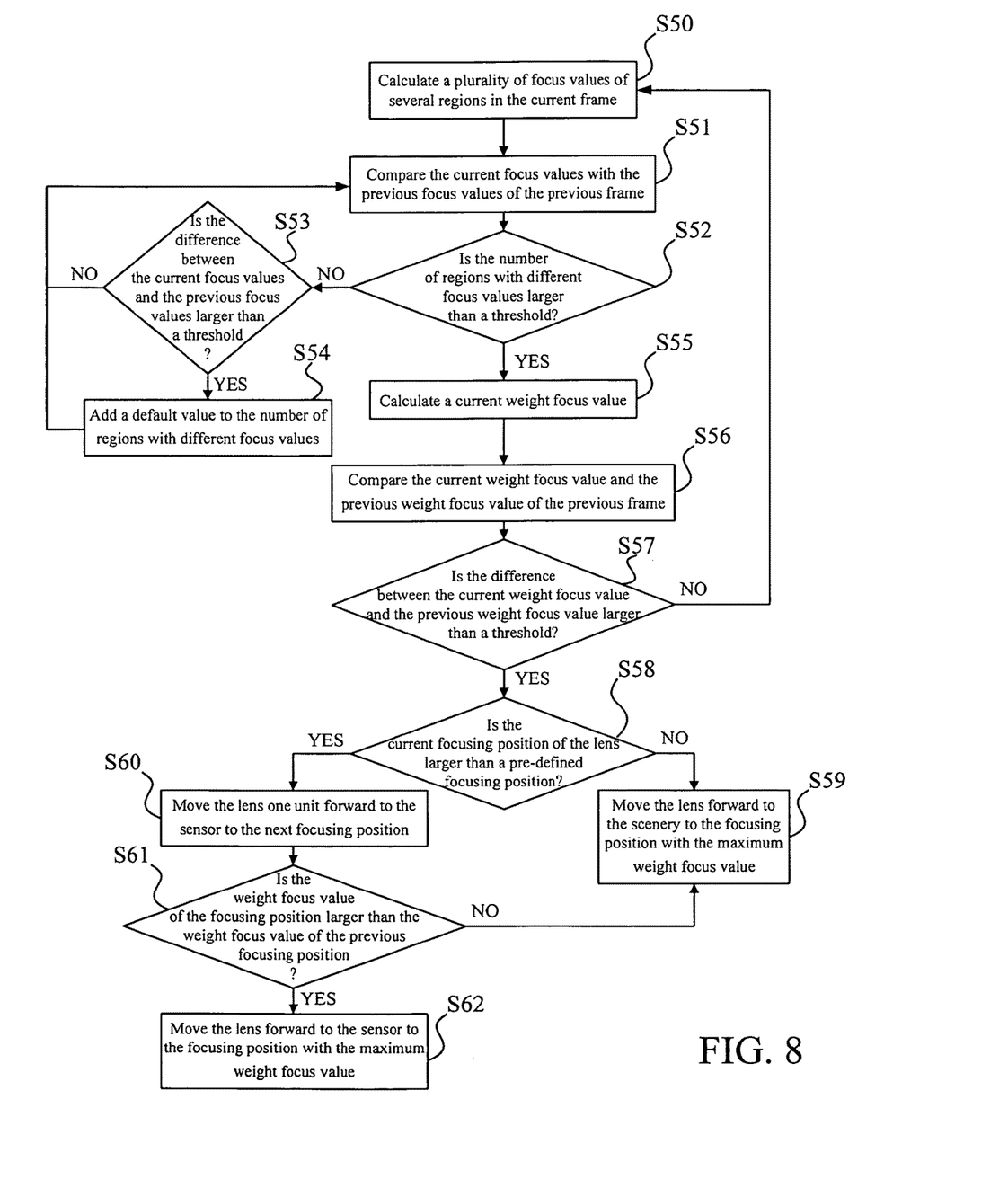
FIG. 8 shows the steps of the focusing control method of an embodiment of the invention.

Please refer to FIG. 8, which shows the steps of the focusing control method of an embodiment of the invention. As shown in FIG. 8, when the image recording system is in a dynamic imaging mode, the focusing control apparatus calculates a plurality of focus values of several regions in the current frame according to the above-mentioned equation [1] (step S50). Then the focusing control apparatus compares the current focus values with the previous focus values of the previous frame (step S51). Afterward, the focusing control apparatus determines if the number of regions with different focus values is larger than a threshold (step S52).

If the result of step S52 is no, further determine if the difference between the current focus values and the previous focus values is larger than a threshold (step S53). If the result of step S53 is no, go back to step S51. However, if the result of step S53 is yes, add a default value to the number of regions with different focus values (step S54), and go back to step S51. Moreover, if the result of step S52 is yes, calculate a current weight focus value according to the current focus values and the above-mentioned equation [2] (step S55). Afterward, compare the current weight focus value and the previous weight focus value of the previous frame (step S56), and determine if the difference between the current weight focus value and the previous weight focus value is larger than a threshold (step S57).

If the result of step S57 is no, hold the lens at the current focusing position and go back to step S50. On the contrary, if the result of step S57 is yes, further determine if the current focusing position of the lens is larger than a pre-defined focusing position (e.g. subtract a default value from the maximum focusing position of the depth of focus table) (step S58). If the result of step S58 is no, move the lens forward to the scenery (opposite to the sensor) to the focusing position with the maximum weight focus value (step S59). On the contrary, if the result of step S58 is yes, move the lens one unit forward to the sensor (opposite to the scenery) to the next focusing position (step S60). Afterward, determine if the weight focus value of the current focusing position is larger than the weight focus value of the previous focusing position (step S61). If no, go back to step S59, and if yes, move the lens forward to the sensor (opposite to the scenery) to the focusing position with the maximum weight focus value (step S62).

Figure 9:
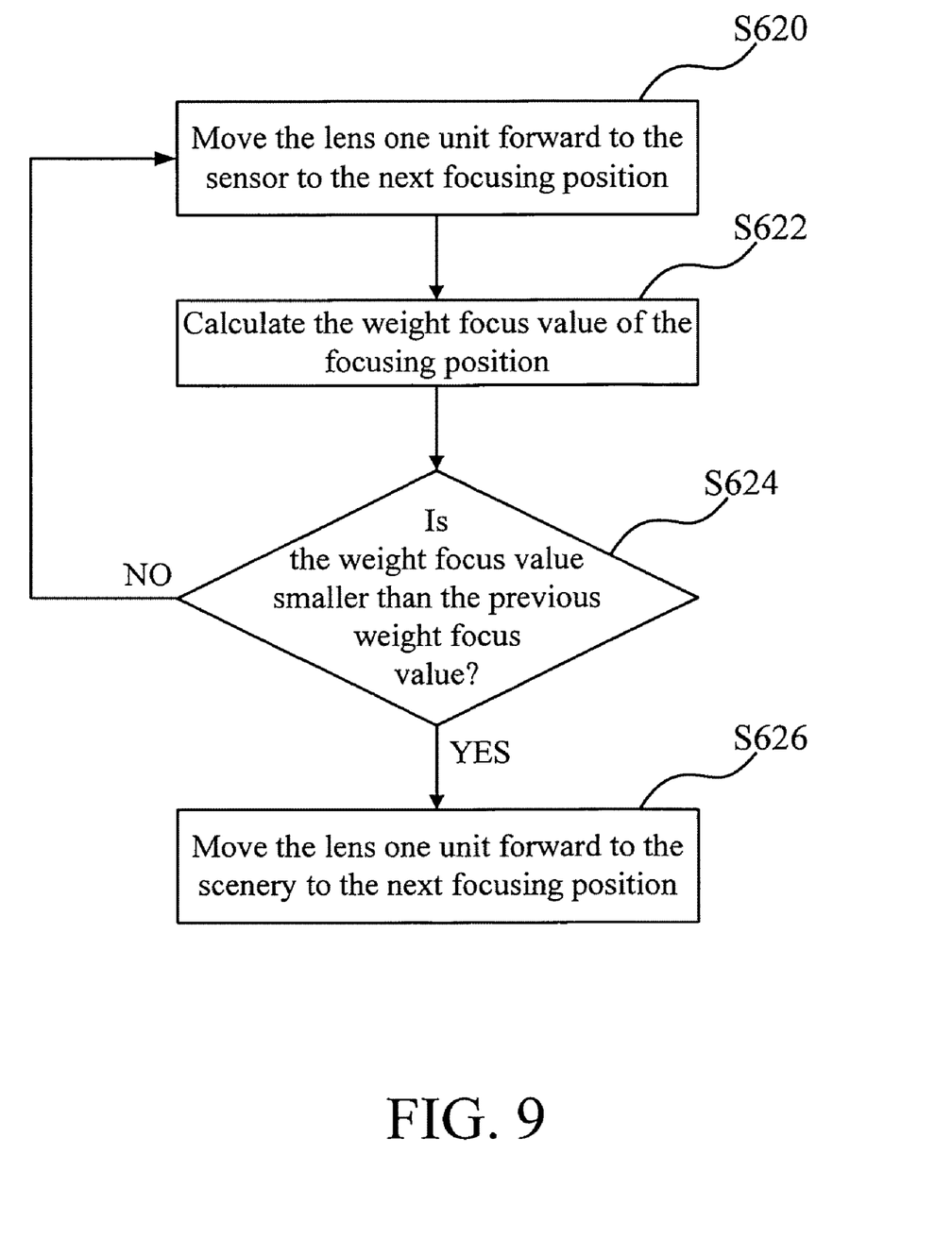
FIG. 9 shows the detailed steps of step S62 in FIG. 8.

Please further refer to FIG. 9, which shows the details of step S62 in FIG. 8. As shown in FIG. 9, step S62 in FIG. 8 further comprises the following steps of: moving the lens one unit forward to the sensor of the next focusing position (step S620). Afterward, calculate the weight focus value of the focusing position of step S620 (step S622). Consequently, determine if the weight focus value smaller than the previous weight focus value (step S624). If the result of step S624 is no, go back to step S620. On the contrary, if the result of step S624 is yes, process step S626, move the lens one unit forward to the scenery of the next focusing position, and let said focusing position to be the final focusing position.

Figure 10:
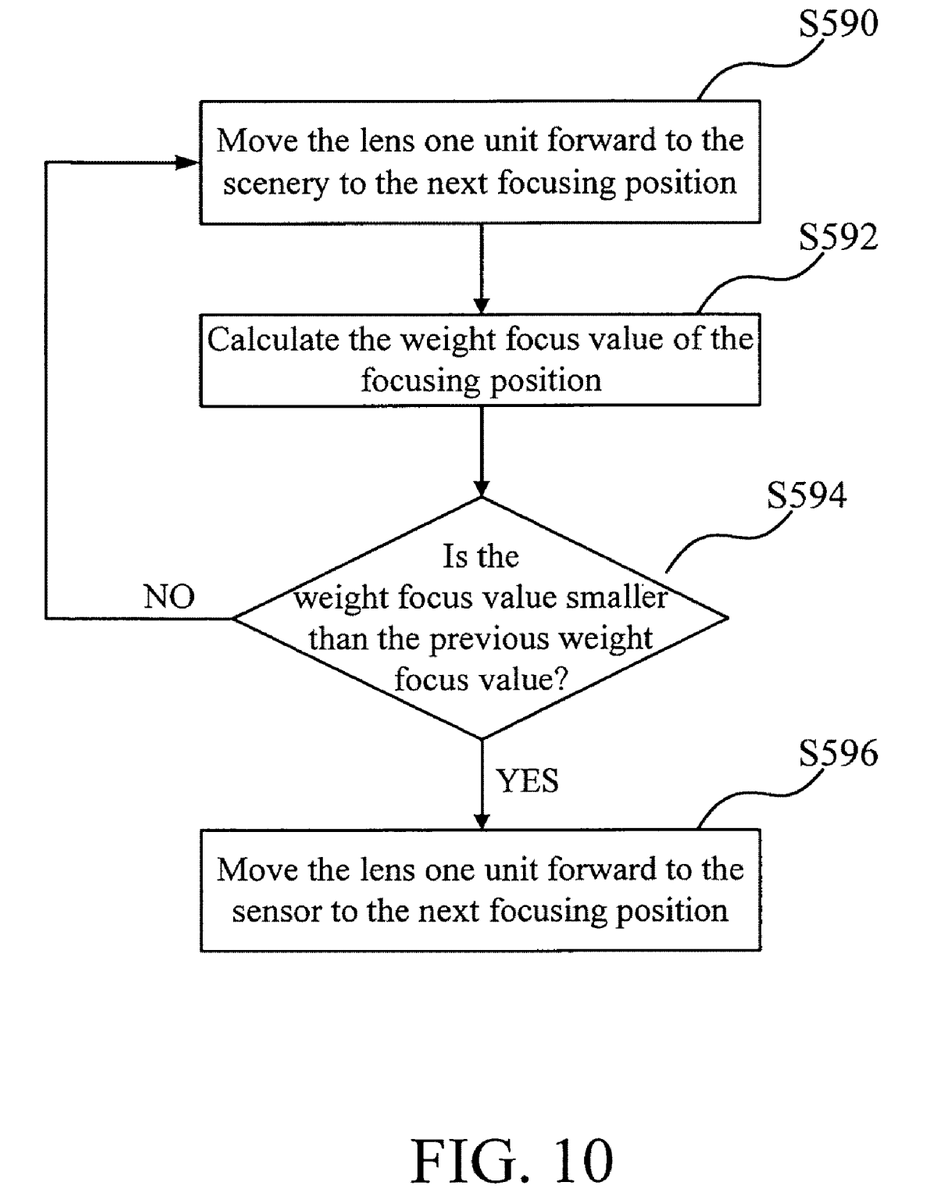
FIG. 10 shows the detailed steps of step S59 in FIG. 8.

Please further refer to FIG. 10, which shows the details of step S59 in FIG. 8. As shown in FIG. 10, step S59 in FIG. 8 further comprises the following steps of: moving the lens one unit forward to the scenery of the next focusing position (step S590). Afterward, calculate the weight focus value of the focusing position of step S590 (step S592). Consequently, determine if the weight focus value smaller than the previous weight focus value (step S594). If the result of step S594 is no, go back to step S590. On the contrary, if the result of step S594 is yes, process step S596, move the lens one unit forward to the sensor of the next focusing position, and lets said focusing position to be the final focusing position.

Please note that the above-mentioned thresholds, default values, and determining criteria can be optionally set, and not limited to the examples described above.

To sum up, the focusing control apparatus and method of the invention can be applied in an image recording system. Particularly, the focusing control apparatus and method simplify the focusing technologies of the prior art. For example, when the focusing control apparatus of the invention moves the lens to focus, it can move the lens to the focusing positions in the simplified depth of focus table only, and not all the focusing positions. Furthermore, the focusing control method of the invention divides the image to several partly overlapped regions to provide the moving information of the scenery, so as to assist the focusing control apparatus moving the lens to new focusing position. Accordingly, the focusing control apparatus and method of the invention can increase the focusing efficiency with limited hardware resources, and it is suitable for applying in mobile electronic apparatus.

Although the present invention has been illustrated and described with reference to the preferred embodiment thereof, it should be understood that it is in no way limited to the details of such embodiment but is capable of numerous modifications within the scope of the appended claims.

What is claimed is:

1. A focusing control apparatus, applied in an image recording system, the focusing control apparatus comprising:
    an evaluating unit for generating, according to an image sensed by a sensor, a plurality of focus values of the image; and
    a control module for calculating a weight focus value in accordance with the focus values, and selectively generating a control signal based on the weight focus value and a depth of focus table, so as to control the movement of a lens of the image recording system;
    wherein the depth of focus table is established based on at least a default parameter;
    wherein the default parameter is selected from the group consisting of a focal length, a pixel size of the sensor, F number and a moving range;
    wherein the depth of focus table is established based on the following equation:

$HD=(1+(FL/2\times F_{num})/(SP\times 2))\times FL$;

wherein HD is a hyperfocal distance; FL is the focal length of the lens; $F_{num}$ is F number; and SP is the pixel size of the sensor.

2. The focusing control apparatus of claim 1, wherein when the image recording system is in a static imaging mode, the control module control the lens moving to a focusing position with the maximum weight focus value.

3. The focusing control apparatus of claim 1, wherein when the image recording system is in a dynamic imaging mode, the control module comparing the focus values of a current frame and a previous frame, and when the difference between said focus values being larger than a threshold, the control module generating the control signal to control the lens moving to a focusing position with the maximum weight focus value.

4. The focusing control apparatus of claim 1, further comprising:
    a memory for recording the depth of focus table.

5. The focusing control apparatus of claim 1, further comprising:

a micro-controller for controlling the movement of the lens based on the control signal.

6. The focusing control apparatus of claim 1, wherein the focus values (F) is calculated based on the following equation:

$$F=R(A_1 \times G_X + G_Y) + G(A_2 \times G_X + G_Y) + B(A_3 \times G_X + G_Y);$$

wherein R is a red plane of the image, G is a green plane of the image, and B is a blue plane of the image;

wherein $G_X = |G_5 - G_4|$, $G_Y = |G_7 - G_2|$, and the coefficients $A_1$, $A_2$, and $A_3$ are applied for weighting the sharpness along a horizontal direction of the image;

wherein $G_2$ is a pixel green value on top of a center pixel green value of the green plane of the image, $G_4$ is a pixel green value on left of a center pixel green value of the green plane of the image, $G_5$ is a pixel green value on right of a center pixel green value of the green plane of the image and $G_7$ is a pixel green value on below of a center pixel green value of the green plane of the image.

7. A focusing control apparatus, applied in an image recording system, the focusing control apparatus comprising:

an evaluating unit for generating, according to an image sensed by a sensor, a plurality of focus values of the image; and a control module for calculating a weight focus value in accordance with the focus values, and selectively generating a control signal based on the weight focus value and a depth of focus table, so as to control the movement of a lens of the image recording system;

wherein each of the focus values is corresponding to one of a plurality of regions partly overlapped on the image;

wherein the weight focus value ($F_W$) is calculated based on the following equation:

$$F_W = F_1/2 + (F_2 + F_3 + F_4 + F_5)/4;$$

wherein $F_1$ is the focus value of the first region of the regions, $F_2$ is the focus value of the second region of the regions, $F_3$ is the focus value of the third region of the regions, $F_4$ is the focus value of the fourth region of the regions, and $F_5$ is the focus value of the fifth region of the regions.

8. A focusing control method, applied in an image recording system, the focusing control method comprising the following steps:

(a) establishing a depth of focus table according to at least a default parameter;

(b) generating a plurality of focus values related to an image;

(c) calculating a weight focus value according to the focus values; and (d) selectively generating a control signal to control the movement of a lens based on the weight focus value and the depth of focus table;

wherein the default parameter is selected from the group consisting of a focal length, a pixel size of the sensor, F number, and a moving range;

wherein the depth of focus table is established based on the following equation:

$$HD = (1 + (FL/2 \times F_{num})/(SP \times 2)) \times FL;$$

wherein HD is a hyperfocal distance; FL is the focal length of the lens; $F_{num}$ is F number; SP is the pixel size of the sensor; and wherein each of the above steps are performed by a focus control apparatus.

9. The focusing control method of claim 8, wherein when the image recording system is in a static imaging mode, the method further comprising:

controlling the lens moving to a focusing position with the maximum weight focus value.

10. The focusing control method of claim 8, wherein when the image recording system is in a dynamic imaging mode, the method further comprising the steps of:

comparing the focus values of a current frame and a previous frame, and when the difference between said focus values being larger than a threshold, generating the control signal to control the lens moving to a focusing position with the maximum weight focus value.

11. The focusing control method of claim 8, wherein the focus values (F) is calculated based on the following equation:

$$F=R(A_1 \times G_X + G_Y) + G(A_2 \times G_X + G_Y) + B(A_3 \times G_X + G_Y);$$

wherein R is a red plane of the image, G is a green plane of the image, and B is a blue plane of the image;

wherein $G_X = |G_5 - G_4|$, $G_Y = |G_7 - G_2|$, and the coefficients $A_1$, $A_2$, and $A_3$ are applied for weighting the sharpness along a horizontal direction of the image;

wherein $G_2$ is a pixel green value on top of a center pixel green value of the green plane of the image, $G_4$ is a pixel green value on left of a center pixel green value of the green plane of the image, $G_5$ is a pixel green value on right of a center pixel green value of the green plane of the image, and $G_7$ is a pixel green value on below of a center pixel green value of the green plane of the image.

12. A focusing control method, applied in an image recording system, the focusing control method comprising the following steps:

(a) establishing a depth of focus table according to at least a default parameter;

(b) generating a plurality of focus values related to an image;

(c) calculating a weight focus value according to the focus values; and (d) selectively generating a control signal to control the movement of a lens based on the weight focus value and the depth of focus table;

wherein each of the focus values is corresponding to one of a plurality of regions partly overlapped on the image;

wherein the weight focus value ($F_W$) is calculated based on the following equation:

$$F_W = F_1/2 + (F_2 + F_3 + F_4 + F_5)/4;$$

wherein $F_1$ is the focus value of the first region of the regions, $F_2$ is the focus value of the second region of the regions, $F_3$ is the focus value of the third region of the regions, $F_4$ is the focus value of the fourth region of the regions, and $F_5$ is the focus value of the fifth region of the regions; and wherein each of the above steps are performed by a focus control apparatus.

* * * * *